United States Patent
Fujimoto et al.

(10) Patent No.: US 9,909,665 B2
(45) Date of Patent: Mar. 6, 2018

(54) GEAR-SHIFTING MECHANISM DRIVING DEVICE

(71) Applicant: HONDA MOTOR CO., LTD., Tokyo (JP)

(72) Inventors: Yasushi Fujimoto, Wako (JP); Hiroyuki Makita, Wako (JP); Taku Hirayama, Wako (JP); Kinya Mizuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 336 days.

(21) Appl. No.: 14/861,477

(22) Filed: Sep. 22, 2015

(65) Prior Publication Data

US 2016/0091088 A1   Mar. 31, 2016

(30) Foreign Application Priority Data

Sep. 29, 2014   (JP) ................. 2014-198457

(51) Int. Cl.
| | |
|---|---|
| *B60K 20/00* | (2006.01) |
| *F16H 59/02* | (2006.01) |
| *F16H 61/32* | (2006.01) |
| *F16H 63/18* | (2006.01) |
| *F16H 63/30* | (2006.01) |

(52) U.S. Cl.
CPC ............ *F16H 61/32* (2013.01); *F16H 63/18* (2013.01); *F16H 2063/3089* (2013.01)

(58) Field of Classification Search
CPC ............................... F16H 59/105; F16H 61/32
USPC .................... 74/335, 473.1, 473.12
See application file for complete search history.

(56) References Cited

U.S. PATENT DOCUMENTS

| | | | | |
|---|---|---|---|---|
| 2,755,679 | A * | 7/1956 | Nallinger | F16H 63/18 318/9 |
| 4,805,472 | A | 2/1989 | Aoki et al. | |
| 5,395,293 | A * | 3/1995 | Matsuura | B60W 10/08 477/15 |
| 6,095,004 | A * | 8/2000 | Ota | F16H 61/32 74/336 R |
| 7,963,183 | B2 * | 6/2011 | Pick | F16H 61/32 74/337 |

FOREIGN PATENT DOCUMENTS

| | | |
|---|---|---|
| EP | 0937913 A2 | 8/1999 |
| EP | 1571378 A1 | 9/2005 |
| JP | 2011-208766 A | 10/2011 |

* cited by examiner

*Primary Examiner* — Ha Dinh Ho
(74) *Attorney, Agent, or Firm* — Birch, Stewart, Kolasch & Birch, LLP

(57) ABSTRACT

A gear-shifting mechanism driving device for allowing a speedy and accurate gear-shifting operation has a light weight even in the case where a shift spindle is short. The gear-shifting mechanism driving device includes a transmission for selectively establishing a gear combination by the turning of a shift spindle for turning a master arm, and an actuator as a power source for turning the shift spindle, in which the gear-shifting mechanism driving device includes a reduction gear shaft provided in a power transmission path between the actuator and the shift spindle, a first gear provided on one end side of the reduction gear shaft to receive power from the actuator side, and a second gear provided on another end side of the reduction gear shaft to transmit power to the shift spindle side. The reduction gear shaft is made of a torsion bar.

20 Claims, 9 Drawing Sheets

GEAR-SHIFTING MECHANISM DRIVING DEVICE

CROSS-REFERENCE TO RELATED APPLICATIONS

The present application claims priority under 35 USC 119 to Japanese Patent Application No. 2014-198457 filed Sep. 29, 2014 the entire contents of which are hereby incorporated by reference.

BACKGROUND OF THE INVENTION

1. Field of the Invention

The present invention relates to a gear-shifting mechanism driving device.

2. Description of Background Art

Heretofore, a gear-shifting mechanism for a driving device is known. See, for example, Japanese Patent Application Publication No. 2011-208766. This gear-shifting mechanism driving device includes a transmission (M) for selectively establishing a gear combination by the turning of a shift spindle (131) for turning a master arm (132), and an actuator (119) as a power source for turning the shift spindle (131).

In a structure (hereinafter referred to as a conventional example), as disclosed in Japanese Patent Application Publication No. 2011-208766, an inputting mechanism including the actuator (119) and a speed reduction mechanism (123) for a rotational driving force thereof and shift position change driving means (110) as an operating mechanism are separately disposed respectively on left and right sides of a crankcase, which also serves as a transmission case. Moreover, the operating mechanism includes the master arm (132) turning integrally with the shift spindle (131), and a stopper member restricting the amount of turning of the master arm (132) by the master arm (132) coming in contact with the stopper member. Further, the shift spindle (131) laterally passing through an inside of the crankcase is connected to the inputting mechanism and the operating mechanism, and a rotational driving force of the inputting mechanism is transmitted to the operating mechanism through the shift spindle (131).

In the gear-shifting mechanism driving device, in the case where gear-shifting speed is desired to be increased, the master arm (132) is turned at a high rotational speed. At this time, the master arm (132) comes in contact with the stopper member to be stopped. Accordingly, as the turning speed of the master arm (132) increases, an impact of the master arm (132) coming in contact with the stopper member increases. The impact is transmitted to the inputting mechanism through the shift spindle (131).

In the conventional example, to reduce the transmission of the impact, the transmission of the impact to the inputting mechanism is reduced by increasing the shaft length of the shift spindle (131) and making the shift spindle (131) easy to twist.

There are cases where a shift spindle has to be short, depending on the layout of the internal structure of an internal combustion engine or the like.

In this case, since the shaft length of the shift spindle becomes short, the shift spindle becomes difficult to twist. Accordingly, when the turning speed of the master arm is high, it is difficult for the shift spindle to sufficiently absorb an impact acting on the master arm when the master arm comes in contact with the stopper member. When the impact is transmitted to the inputting mechanism through the shift spindle, there is a possibility that the accuracy of the inputting mechanism is influenced. To improve the strength of the inputting mechanism to avoid the influence, the thicknesses and diameters of gears need to be increased, and there arises such a problem that the size of the inputting mechanism is increased.

SUMMARY AND OBJECTS OF THE INVENTION

An object of an embodiment of the present invention is to provide a gear-shifting mechanism driving device which allows a speedy and accurate gear-shifting operation and has a light weight even in the case where a shift spindle is short.

To solve the above-described problem, a gear-shifting mechanism driving device of an embodiment of the present invention is a gear-shifting mechanism driving device including a transmission for selectively establishing a gear combination by turning of a shift spindle for turning a master arm. An actuator is provided as a power source for turning the shift spindle, in which the gear-shifting mechanism driving device includes:

a reduction gear shaft provided in a power transmission path between the actuator and the shift spindle;

a first gear provided on one end side of the reduction gear shaft to receive power from the actuator side; and a second gear provided on another end side of the reduction gear shaft to transmit power to the shift spindle side, in which the reduction gear shaft includes a torsion bar.

According to an embodiment of the present invention, in the gear-shifting mechanism driving device, transmitted torque acting on the reduction gear shaft having the first gear provided on the one end side thereof to receive power from the actuator and having the second gear provided on the other end side thereof to transmit power to the shift spindle side is smaller than transmitted torque acting on the shift spindle.

According to an embodiment of the present invention, since the reduction gear shaft is made of a torsion bar, the shaft diameter can be made small. Accordingly, the reduction gear shaft can be easily twisted to sufficiently absorb an impact acting on the master arm. Thus, the weight of the reduction gear shaft can be reduced.

In other words, according to an embodiment of the present invention in the gear-shifting mechanism driving device, even in the case where the shift spindle is short, a gear-shifting operation can be speedily and accurately performed, and the weight of the gear-shifting mechanism driving device can be reduced.

According to an embodiment of the present invention, in this gear-shifting mechanism driving device, the reduction gear shaft may be formed such that a portion other than a gear support portion or portions for supporting the first gear and/or the second gear has a smaller diameter than the gear support portion or portions.

According to an embodiment of the present invention, in this configuration, the reduction gear shaft can be made easy to twist while ensuring the strength or strengths of the gear support portion or portions for supporting the first gear and/or the second gear so that the reduction gear shaft can sufficiently absorb an impact acting on the master arm. Thus, the weight of the reduction gear shaft can be reduced.

According to an embodiment of the present invention, in this gear-shifting mechanism driving device, the reduction gear shaft may be disposed next to the shift spindle to be parallel to the shift spindle and overlap the shift spindle with respect to an axial direction thereof.

In this configuration, since the reduction gear shaft and the shift spindle are disposed next to each other and parallel to each other, a function of the reduction gear shaft as a torsion bar can be made favorable, and the size of the device can be reduced.

According to an embodiment of the present invention, in this gear-shifting mechanism driving device, the master arm may be disposed between the first gear and the second gear.

In this configuration, the master arm is disposed within the range of the reduction gear shaft with respect to the longitudinal direction thereof. Thus, the length of the device with respect to the axial direction thereof can be reduced.

According to an embodiment of the present invention, in this gear-shifting mechanism driving device, the actuator may be a motor, and the reduction gear shaft may be disposed next to the output shaft of the motor to be parallel to the output shaft and overlap the output shaft with respect to the axial direction thereof.

According to an embodiment of the present invention, in this configuration, the actuator can be disposed within the range of the reduction gear shaft with respect to the longitudinal direction thereof. Thus, the size of the device can be reduced.

According to an embodiment of the present invention, in this gear-shifting mechanism driving device, the reduction gear shaft and the shift spindle may be supported by the same wall portion W on the second gear side of the reduction gear shaft.

In this configuration, the accuracy of the relative position between the reduction gear shaft and the shift spindle can be made favorable on the second gear side of the reduction gear shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
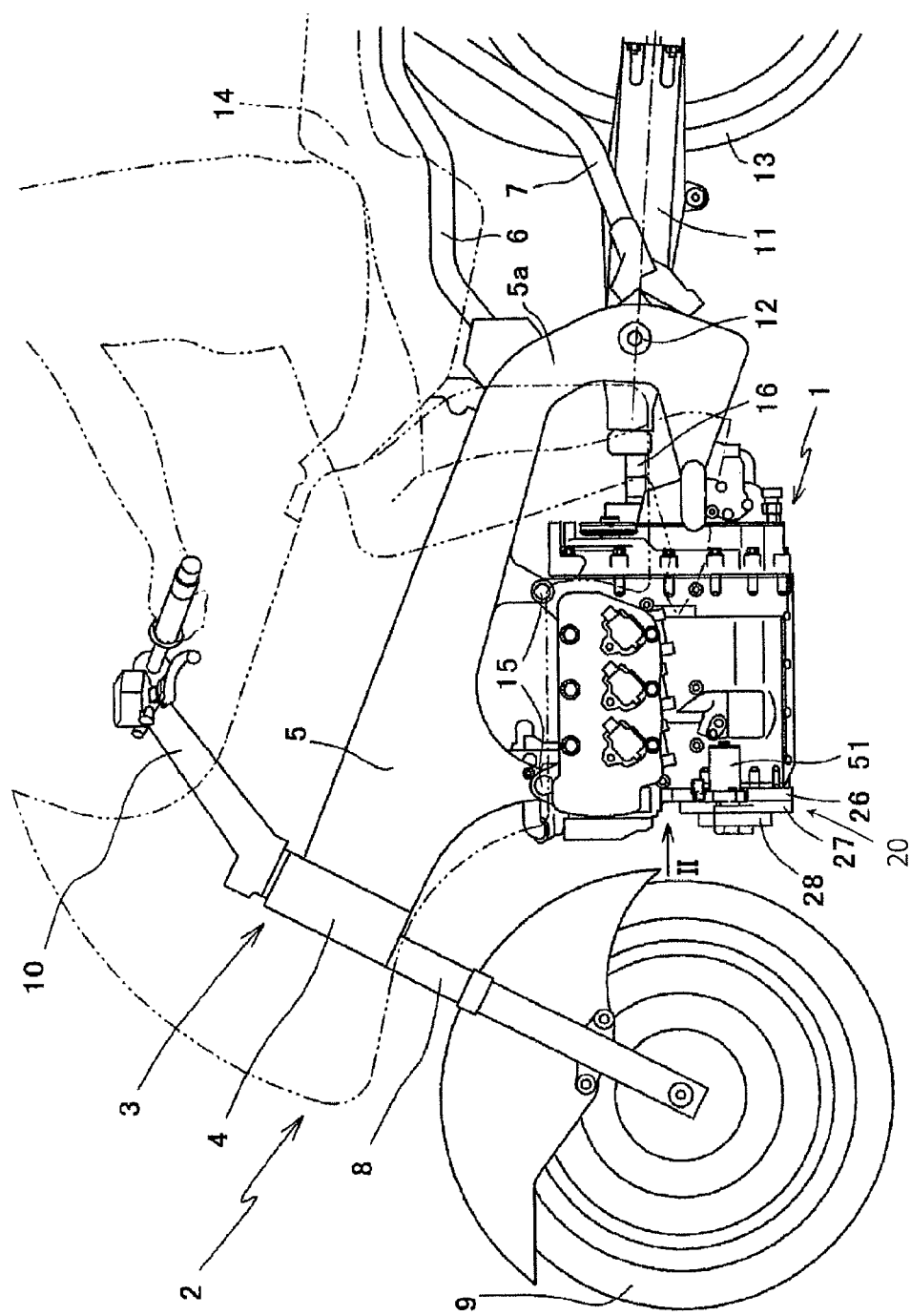
FIG. 1 is a left side view showing a motorcycle using one embodiment of a gear-shifting mechanism driving device according to the present invention, part of the motorcycle being omitted.

Hereinafter, an embodiment of a gear-shifting mechanism driving device according to the present invention will be described with reference to drawings. It should be noted that the drawings are to be seen in the directions of reference numerals. In the following description, forward, backward, right, left, upward, and downward directions are directions as seen from an operator. The forward, backward, right, left, upward, and downward directions with respect to a vehicle are denoted by forward, backward, right, left, up, and down in the drawings as needed. In the drawings, the same or corresponding portions are denoted by the same reference numerals.

Figure 2:
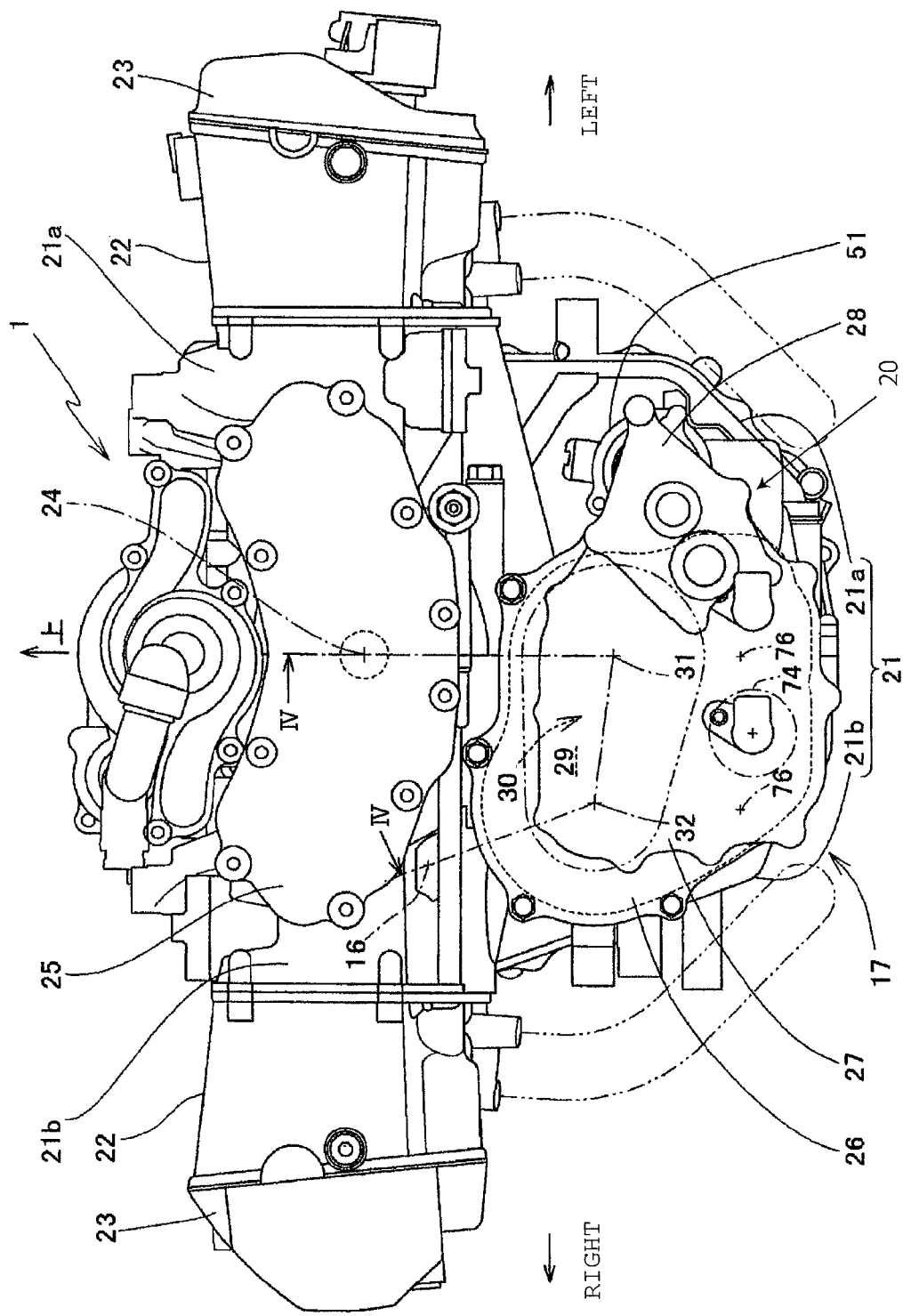
FIG. 2 is a front view of an internal combustion engine as seen from arrow II of FIG. 1.

As shown in FIGS. 1 and 2, a gear-shifting mechanism driving device 20 of this embodiment is used in an internal combustion engine 1 mounted on a motorcycle 2. The internal combustion engine 1 is a water-cooled, horizontally-opposed, six-cylinder, four-stroke internal combustion engine mounted by so-called longitudinal mounting with a crankshaft 24 directed along a longitudinal direction of the vehicle.

As shown in FIG. 1, a body frame 3 of the motorcycle 2 includes a pair of left and right main frames 5 extending from a head pipe 4 in a front portion of the vehicle body backward and slightly obliquely downward and then extending from curved portions 5a downwardly. Seat rails 6 extend from the curved portions 5a of the main frames 5 backward and slightly obliquely upwardly with a back stay 7 connecting rear portions of the seat rails 6 and lower portions of the curved portions 5a of the main frames 5.

A front fork 8 extending downwardly from the head pipe 4 is supported by the head pipe 4 to be swingable to right and left. A front wheel 9 is pivotally supported by a lower end of the front fork 8, and a steering handle 10 is integrally connected to an upper end of the front fork 8.

Below the curved portions 5a of the main frames 5, a front end portion of a swing arm 11 extending backward is pivotally supported by a pivot shaft 12 to be vertically swingable. A rear wheel 13 is pivotally supported by a rear end portion of the swing arm 11.

An unillustrated shock absorber is connected between the curved portions 5a of the main frames 5 and the swing arm 11. A riding seat 14 is attached to upper portions of the seat rails 6.

An internal combustion engine 1 for driving the rear wheel 13 is disposed below the main frames 5. The internal combustion engine 1 is suspended by a plurality of installation brackets 15 to be mounted on the motorcycle 2.

As shown in FIG. 2, the internal combustion engine 1 includes a crankcase 21 including a left crankcase 21a and a right crankcase 21b, cylinder heads 22 respectively connected to left and right ends of the crankcase 21, and cylinder head covers 23 respectively placed on the cylinder heads 22.

A crankshaft 24, which is located above the crankcase 21, is pivotally supported between the left crankcase 21 a and the right crankcase 21 b in a rotatable manner with the axis thereof directed in the longitudinal direction of the motorcycle 2.

Pistons (not shown) in the crankcases 21 a and 21 b are connected to the crankshaft 24 through connecting rods (not shown). The crankshaft 24 is rotationally driven in synchronization with the sliding of the pistons caused by combustion in combustion chambers (not shown).

A front cover 25 for covering an upper portion of a front surface of the crankcase 21 is attached to the front surface of the upper portion of the crankcase 21 to be centered at the crankshaft 24. Moreover, a space located in a lower portion of the crankcase 21 and demarcated by the left crankcase 21a and the right crankcase 21b is a transmission chamber 29 in which a transmission 30 described later is housed.

Figure 3:
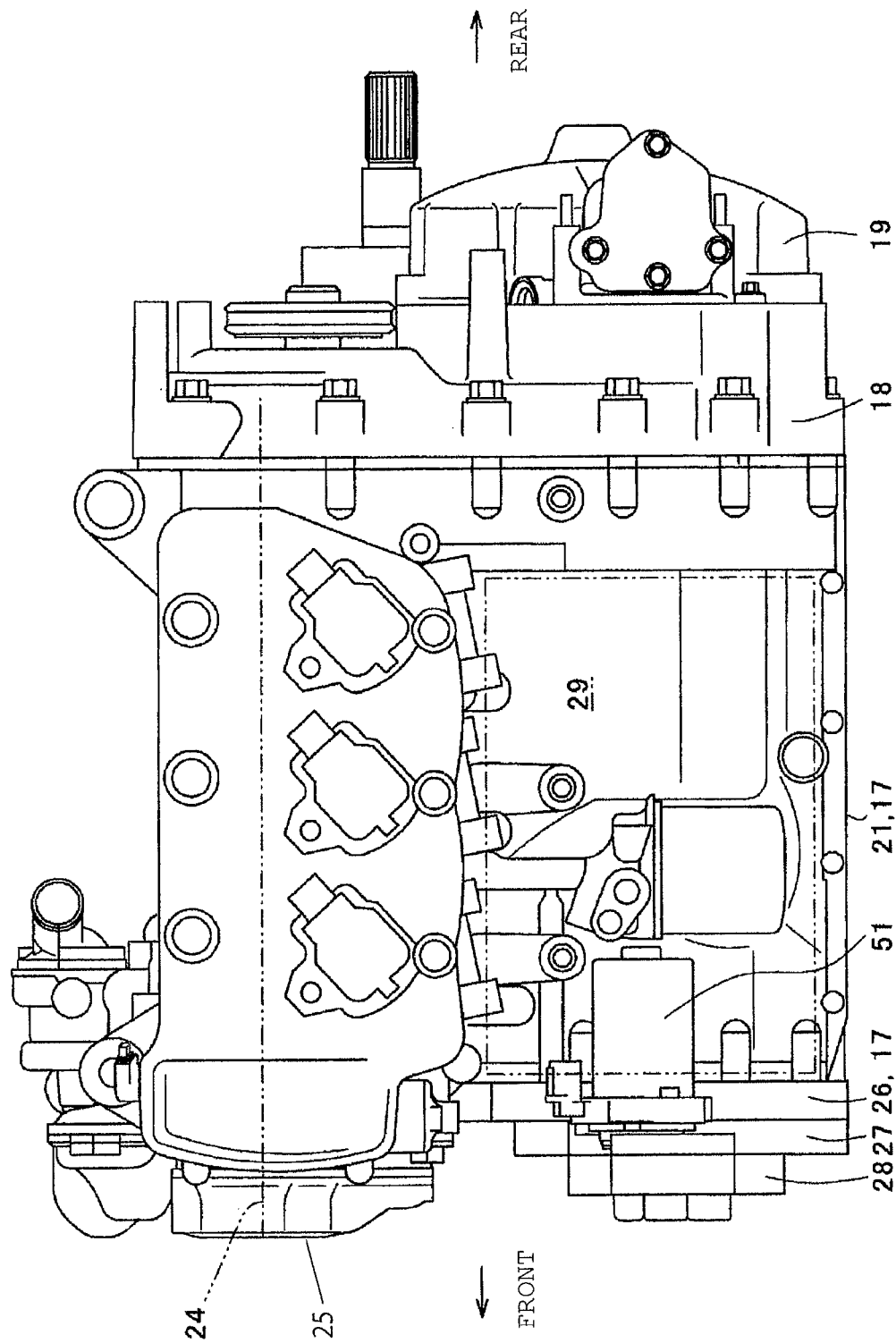
FIG. 3 is a left side view of the internal combustion engine of FIG. 1.

As shown in FIGS. 2 and 3, a rear cover 18 is attached to a rear portion of the crankcase 21. A clutch cover 19 is attached to a back of a central portion of a lower portion of the rear cover 18.

A transmission holder 26 is attached to a front of the lower portion of the crankcase to cover a front of the transmission chamber 29.

A change system holder 27 for holding an operating mechanism 70 (FIG. 6) which operates gears of the transmission 30 is attached to a front surface of the transmission holder 26 to be located from a central portion of the transmission holder 26 to a lower portion thereof.

A speed reduction drive holder 28 which holds an inputting mechanism 50 for supplying power to the operating mechanism 70 is attached to a left end potion of a front surface of the change system holder 27.

A shift motor 51 as an actuator which is a power source of the inputting mechanism 50 is provided at a left end potion of a rear surface of the change system holder 27.

A gear change mechanism 40, a main shaft 31, a countershaft 32, shifter fork shafts 76, and a shift drum 74 are sub-assembled on a rear surface of the transmission holder 26 to be integrally configured into a cassette unit. The cassette unit is inserted into the transmission chamber 29 formed by the left crankcase 21a and the right crankcase 21b, and the transmission holder 26 is attached to a front surface of the lower portion of the crankcase 21 to close a front portion of the transmission chamber 29. Thus, the crankcase 21 and the transmission holder 26 function as a transmission case 17. It should be noted that the cassette unit may be attached to the crankcase 21 in a state in which the speed reduction drive holder 28 and the shift motor 51 are also incorporated into the unit (sub-assembled).

Figure 4:
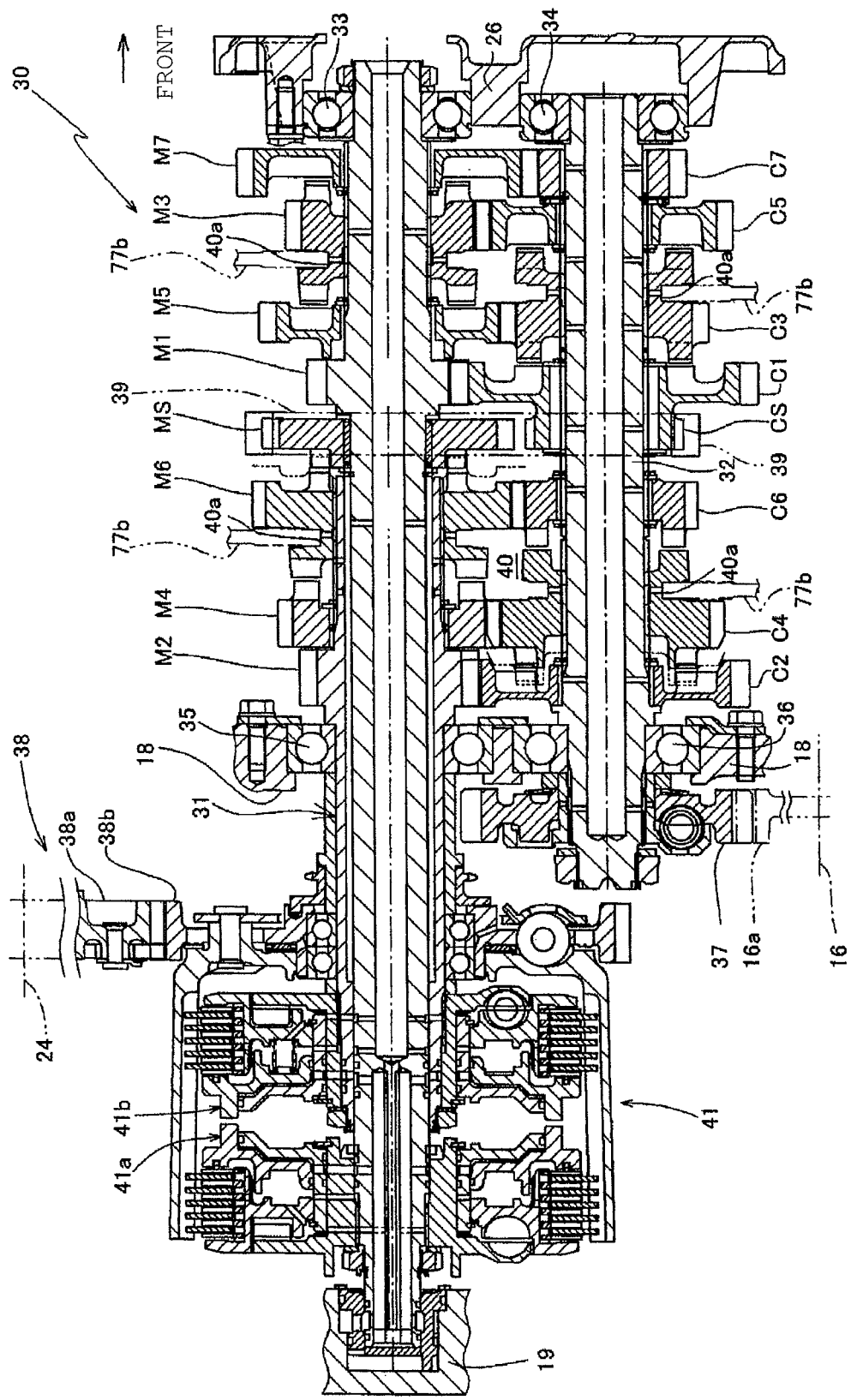
FIG. 4 is a cross-sectional view of a transmission taken along line IV-IV of FIG. 2.
Figure 6:
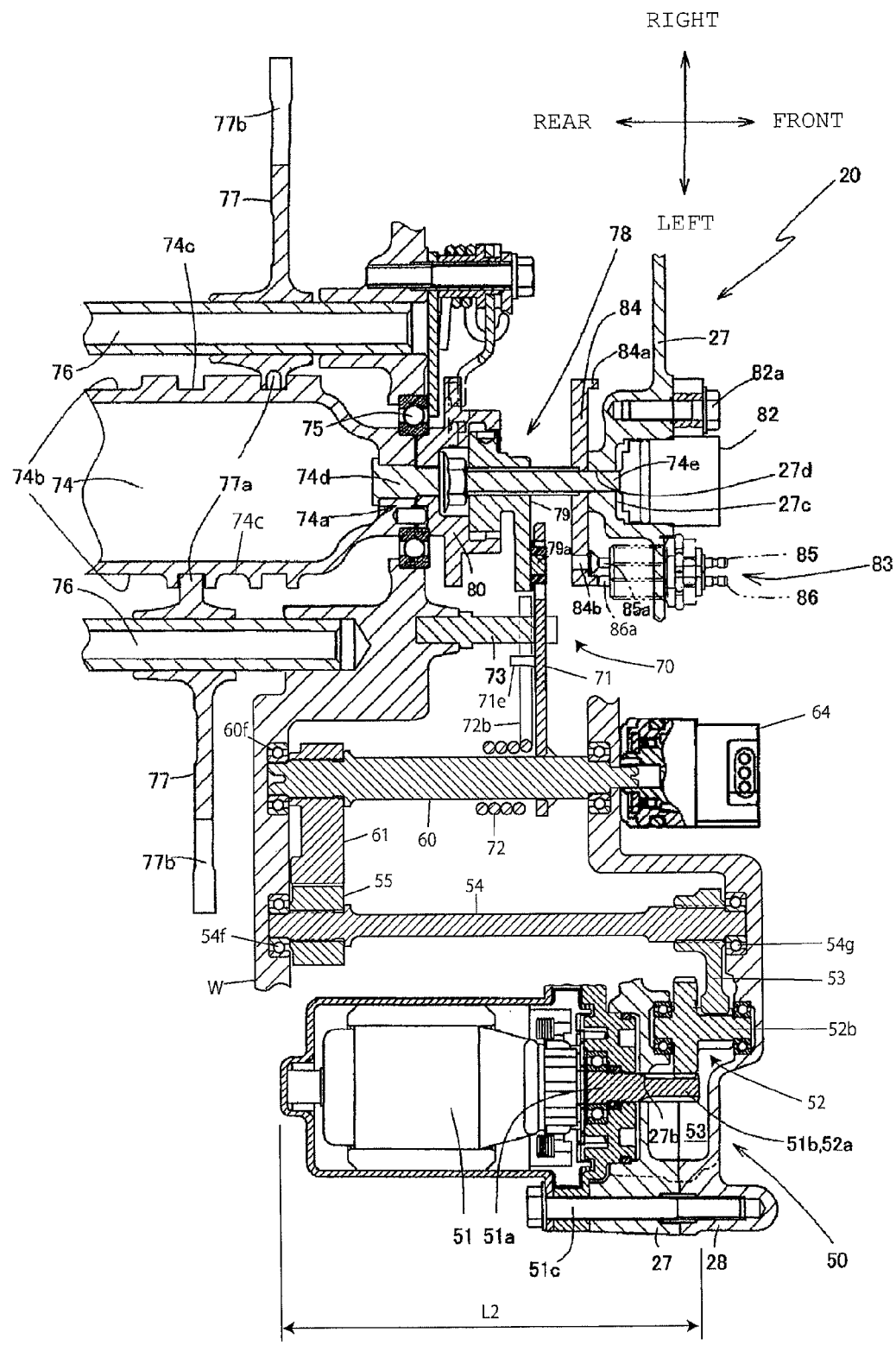
FIG. 6 is a cross-sectional view taken along line VI-VI of FIG. 5.

As shown in FIGS. 3, 4, and 6, the main shaft 31, the countershaft 32, the shifter fork shafts 76, and the shift drum 74 inserted in the transmission chamber 29 are disposed parallel to the crankshaft 24.

As shown in FIG. 2, the main shaft 31 is disposed below the crankshaft 24, and the countershaft 32 is disposed to the right of the main shaft 31. The shift drum 74 is disposed in a central portion of a lower portion of the transmission chamber 29. The two shifter fork shafts 76 are disposed on to the left and right of the shift drum 74 below the main shaft 31 and the countershaft 32.

As shown in FIG. 4, the transmission 30 includes the main shaft 31, the countershaft 32, the gear change mechanism 40, and a clutch mechanism 41.

The clutch mechanism 41 is configured as a so-called dual-clutch module (twin-clutch module) to include a first oil hydraulic clutch 41a and a second oil hydraulic clutch 41b which are of an oil hydraulic type.

One end portion of the main shaft 31 is rotatably supported by the transmission holder 26 with a ball bearing 33 interposed therebetween. Another end portion of the main shaft 31 is disposed to pass through a ball bearing 35 attached to the rear cover 18. A central portion of the main shaft 31 is rotatably supported by the rear cover 18 with the ball bearing 35 interposed therebetween.

One end portion of the countershaft 32 is rotatably supported by the transmission holder 26 with a ball bearing 34 interposed therebetween. Another end portion of the countershaft 32 is disposed to pass through a ball bearing 36 attached to the rear cover 18 and is rotatably supported by the rear cover 18 with a ball bearing 36 interposed therebetween.

Seven drive transmission gears M, denoted by M1 to M7, are provided on the main shaft 31 to be arranged from one end portion of the main shaft 31 to a central portion thereof. Driven transmission gears C, denoted by C1 to C7, are provided on the countershaft 32 to correspond to and always mesh with the drive transmission gears M.

Reverse sprockets MS and CS are provided on the main shaft 31 and the countershaft 32 to be located at positions at which the reverse sprockets MS and CS face each other, and a chain 39 is passed over the reverse sprockets MS and CS.

The drive transmission gears M, the driven transmission gears C, and the reverse sprockets S constitute the gear change mechanism 40.

The third-speed drive transmission gear M3 is a shifter gear capable of sliding on the main shaft 31 to be selectively engaged with the fifth-speed drive transmission gear or the seventh-speed drive transmission gear M7 adjacent thereto.

The sixth-speed drive transmission gear M6 is a shifter gear capable of sliding on the main shaft 31 to be selectively engaged with the fourth-speed drive transmission gear M4 or the reverse sprocket MS adjacent thereto.

The fourth-speed driven transmission gear C4 is a shifter gear capable of sliding on the countershaft 32 to be selectively engaged with the second-speed driven transmission gear C2 or the sixth-speed driven transmission gear C6 adjacent thereto.

The third-speed driven transmission gear C3 is a shifter gear capable of sliding on the countershaft 32 to be selectively engaged with the first-speed driven transmission gear C1 or the fifth-speed driven transmission gear C5 adjacent thereto.

A fork engagement groove 40a is provided in each of the above-described shifter gears. A shifter fork 77 which engages with the fork engagement groove 40a allows the shifter gear to slide in the axial direction.

It should be noted that the gear change mechanism 40 has a neutral position at which all gear trains are invalid and at which no power is transmitted and a reverse position formed by the reverse sprocket S.

The clutch mechanism 41 including the first oil hydraulic clutch 41a and the second oil hydraulic clutch 41b is splined to a portion of the main shaft 31 protruding from the rear cover 18. Another end portion of the main shaft 31 is rotatably supported by the clutch cover 19.

The power of the crankshaft 24 is transmitted through the primary drive gear 38a and the primary driven gear 38b of the speed reduction mechanism 38 to the clutch mechanism 41 including the first oil hydraulic clutch 41a and the second oil hydraulic clutch 41b. The first oil hydraulic clutch 41a and the second oil hydraulic clutch 41b are selectively connected by the oil hydraulic circuit, and power is thereby transmitted from the crankshaft 24 to the main shaft 31.

A secondary drive gear 37 is splined to the other end portion of the countershaft 32 protruding from the rear cover 18. The power transmitted from the crankshaft 24 to the main shaft 31 is transmitted to the secondary drive gear 37 with a gear combination selectively established by the gear change mechanism 40, and is transmitted to the rear wheel 13 (see FIG. 1) through the secondary driven gear 16a and the drive shaft 16.

Figure 5:
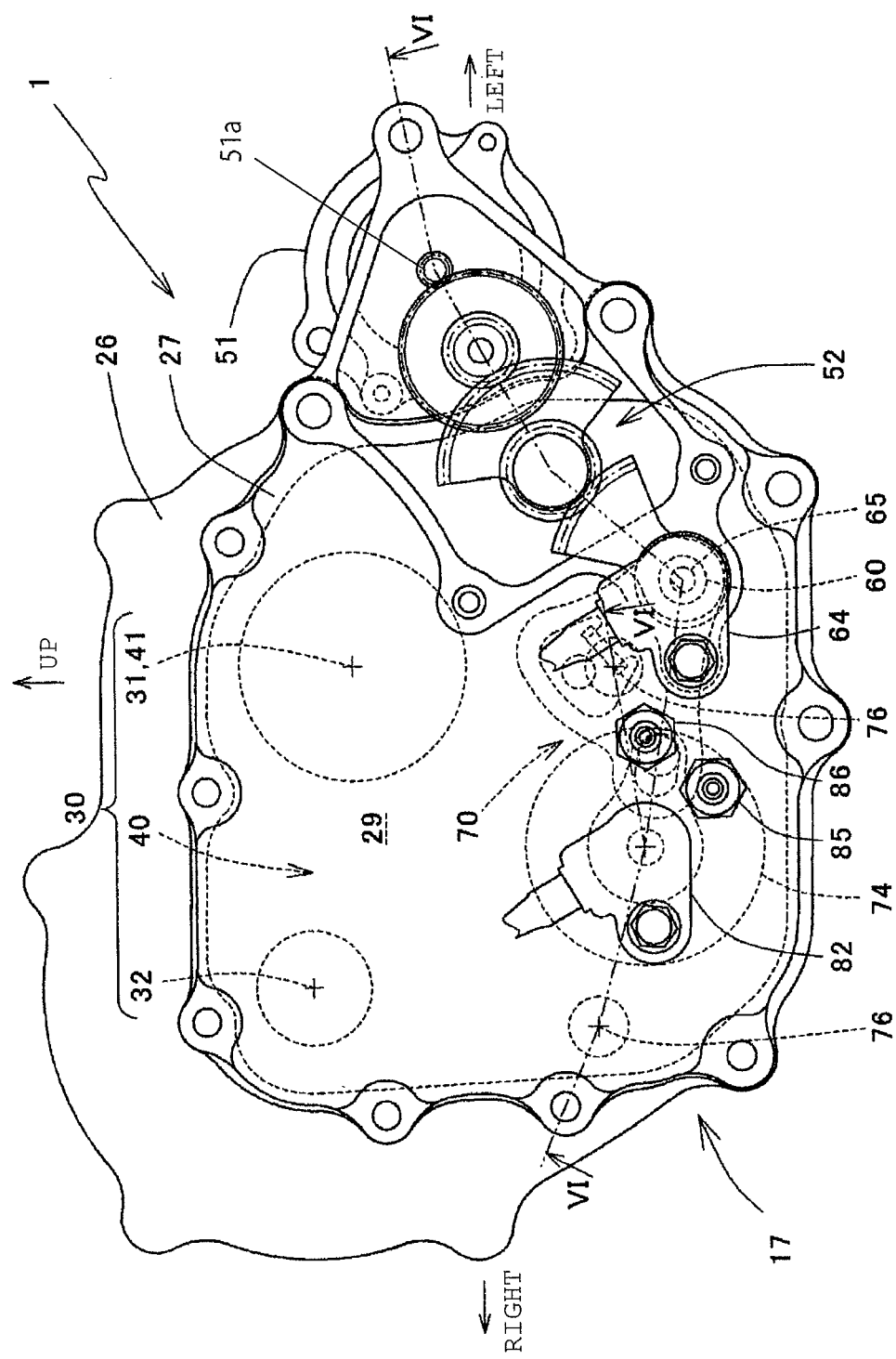
FIG. 5 is a front view showing a transmission holder and a change system holder of the internal combustion engine with a speed reduction drive holder removed.

FIG. 5 is a front view showing the transmission holder 26 and the change system holder 27 of the internal combustion engine 1 with the speed reduction drive holder 28 removed. FIG. 6 is a cross-sectional view taken along line VI-VI which shows a gear-shifting mechanism driving device of the internal combustion engine 1 of FIG. 5.

A gear-shifting mechanism driving device 20 which moves the shifter gears of the transmission 30 to perform gear shifting will be described with reference to FIGS. 5 and 6.

The gear-shifting mechanism driving device 20 includes the inputting mechanism 50 disposed outside the transmission case 17, a shift spindle 60, and the operating mechanism 70.

Power required for gear shifting is inputted from the shift motor 51 of the inputting mechanism 50 to the shift spindle 60. The master arm 71 of the operating mechanism 70 acts in synchronization with the turning of the shift spindle 60 to intermittently turn the shift drum 74. Thus, the shifter forks 77 move the shifter gears of the transmission 30 to perform gear shifting.

The inputting mechanism 50 includes the shift motor 51 and a speed reduction gearing mechanism 52 connected to the shift motor 51.

As shown in FIGS. 3 and 6, the shift motor 51 is disposed on a rear surface of a left end potion of the change system holder 27 as seen from the front surface of the vehicle in a state in which the shift motor 51 is directed in the front-back direction such that a motor shaft 51 a thereof is parallel to the crankshaft 24.

As shown in FIG. 6, the shift motor 51 has the motor shaft 51a protruding forward. The motor shaft 51 a is inserted in an opening portion 27b formed in the rear surface of the left end potion of the change system holder 27. The shift motor 51 is fixed to the change system holder 27 with bolts 51c from behind.

A tip portion 51b of the motor shaft 51a protrudes into a speed reduction drive chamber 53 for housing the speed reduction gearing mechanism 52 formed between the change system holder 27 and the speed reduction drive holder 28 and described later, and has a drive gear 52a formed integrally therewith. The drive gear 52a is configured to transmit the rotational power of the shift motor 51 to the speed reduction gearing mechanism 52.

As shown in FIGS. 5 and 6, the speed reduction drive chamber 53 for housing the speed reduction gearing mechanism 52 is located ahead of and to the right of the shift motor 51.

The speed reduction gearing mechanism 52 includes the drive gear 52a formed integrally with the motor shaft 51a and a reduction gear 52b.

A reduction gear shaft 54 is provided in the power transmission path between the shift motor 51 as an actuator and the shift spindle 60.

A first gear 53 which receives power from the shift motor 51 side is provided on one end side (power input side) of the reduction gear shaft 54. The first gear 53 is a sector gear which meshes with the reduction gear 52b.

A second gear 55 which transmits power to the shift spindle 60 side is provided on another end side (power output side) of the reduction gear shaft 54. The second gear 55 transmits power to the shift spindle 60 by meshing with a sector gear 61 provided on the shift spindle 60.

The reduction gear shaft 54 is made of a torsion bar.

Both the reduction gear shaft 54 and the shift spindle 60 are made of spring steel.

Figure 7:
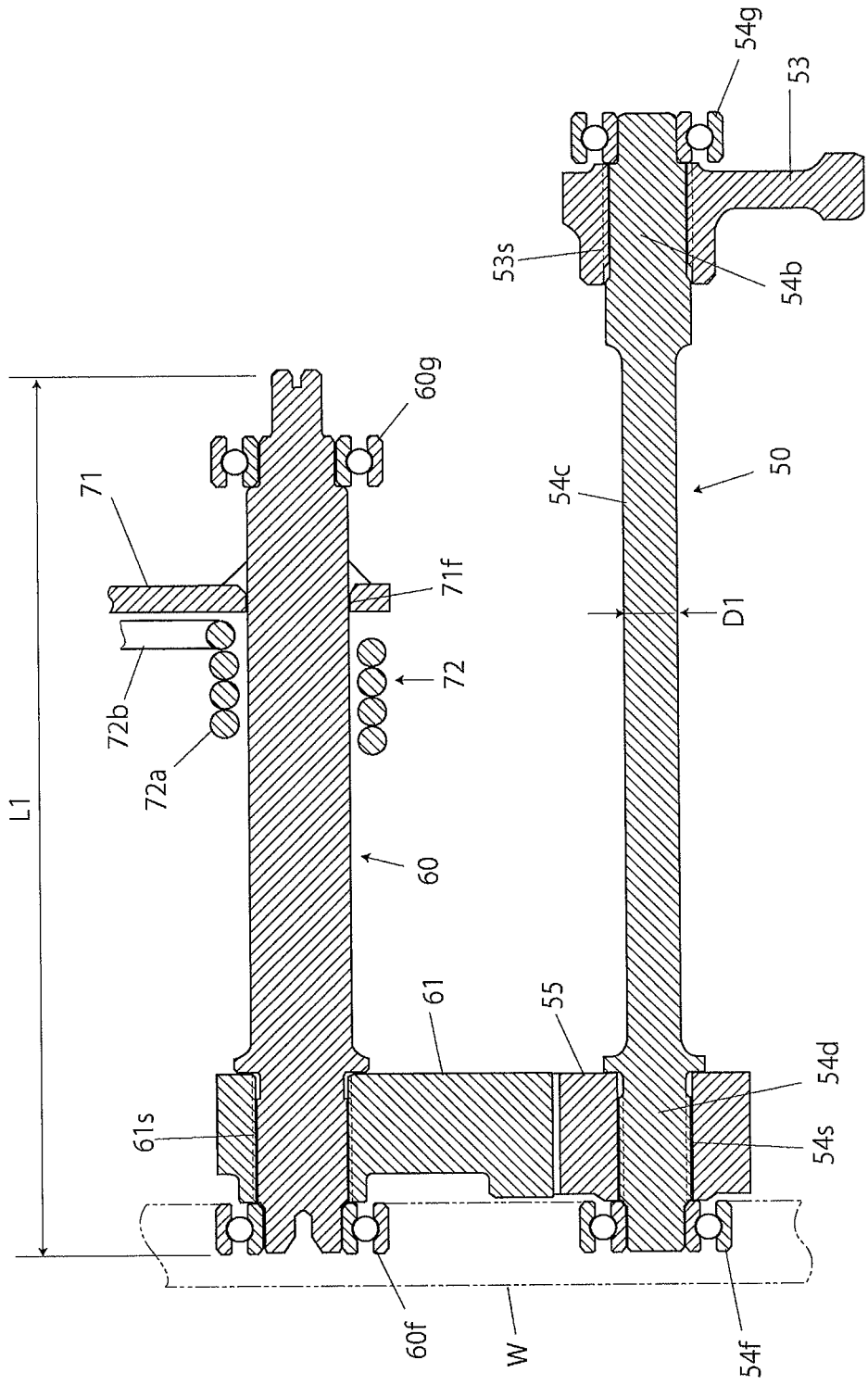
FIG. 7 is an enlarged view of part of FIG. 6.

As shown in FIG. 7, a portion 54c of the reduction gear shaft 54 other than gear support portions 54b and 54d thereof supporting the first gear 53 and the second gear 55 has a smaller diameter D1 than the gear support portions 54b and 54d.

The first gear 53 and the second gear 55 are attached to the reduction gear shaft 54 by spline couplings 53s and 55s to be incapable of rotation relative to the reduction gear shaft 54, respectively.

The sector gear 61 is attached to the shift spindle 60 by a spline coupling 61s to be incapable of rotation relative to the shift spindle 60.

The reduction gear shaft 54 is disposed next to the shift spindle 60 to be parallel to the shift spindle 60 and overlap the shift spindle 60 with respect to the axial direction. An overlapping portion is denoted by L1 in FIG. 7.

The master arm 71 is disposed between the first gear 53 and the second gear 55.

The master arm 71 is fixed to the shift spindle 60 by welding.

The reduction gear shaft 54 is disposed next to the output shaft 51a of the shift motor 51 to be parallel to the output shaft 51a and overlap the output shaft 51a with respect to the axial direction. An overlapping portion is denoted by L2 in FIG. 6.

As shown in FIG. 6, the reduction gear shaft 54 and the shift spindle 60 are supported by the same wall portion W on the second gear 55 side (other end side) of the reduction gear shaft 54.

The other end side of the reduction gear shaft 54 is supported by the wall portion W with a bearing 54f interposed therebetween, and the one end side (first gear 53 side) thereof is supported by the speed reduction drive holder 28 with a bearing 54g interposed therebetween.

Another end side of the shift spindle 60 is supported by the wall portion W with a bearing 60f interposed therebetween, and one end side thereof is supported by the speed reduction drive holder 28 with a bearing 60g interposed therebetween.

One end side of the shift spindle 60 is connected to a turning angle sensor 64 for detecting the turning angle of the shift spindle 60. As shown in FIG. 5, the turning angle sensor 64 is located ahead of the shift spindle 60, and is disposed on the front surface of the speed reduction drive holder 28.

Next, an operating mechanism 70 for intermittently turning the shift drum 74 in synchronization with the turning of the shift spindle 60 will be described.

As shown in FIG. 6, the operating mechanism 70 includes a master arm 71 turning integrally with the shift spindle 60, a return spring 72 for biasing the master arm 71 such that the master arm 71 returns to a position before operation, a stopper member 73 for restricting the amount of turning of the master arm 71, and a pawl ratchet mechanism 78 for intermittently turning the shift drum 74 in synchronization with the turning of the master arm 71.

Figure 8:
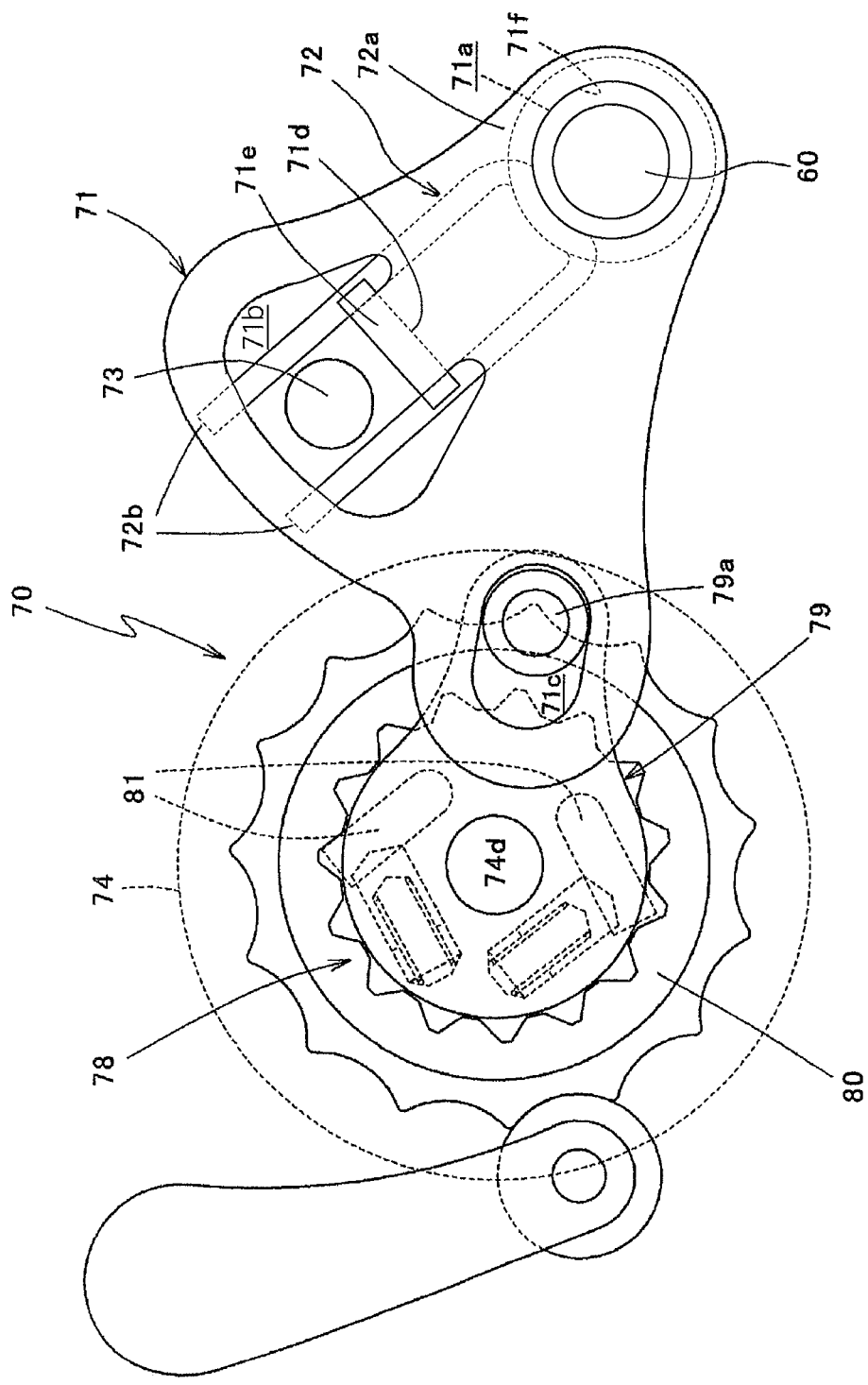
FIG. 8 is a view for explaining movements of a shift spindle and a master arm.

FIG. 8 is an enlarged view of principal portions of the operating mechanism 70 and the shift spindle 60, part of which is shown in a simplified manner.

As shown in FIGS. 6 to 8, the master arm 71 is disposed to connect the shift spindle 60 and the pawl ratchet mechanism 78 disposed to the right of the shift spindle 60.

As shown in FIG. 8, the master arm 71 is formed in the shape of an approximately triangular plate. One corner portion of the master arm 71 has a circular hole 71a. Another corner portion of the master arm 71 has an approximately trapezoidal restricting hole 71b. The rest of the corner portions of the master arm 71 has a drive hole 71c having the shape of a rounded rectangle.

As shown in FIG. 7, of end portions of the restricting hole 71b, an end portion 71d on the circular hole 71a side is bent toward a rear surface of the master arm 71 to form an engaging portion 71e.

As shown in FIG. 7, the circular hole 71a of the master arm 71 is formed to have the same outside diameter as the shift spindle 60. The shift spindle 60 is inserted in the circular hole 71a of the master arm 71. The shift spindle 60 is integrally welded to an inner circumferential surface 71f of the circular hole 71a of the master arm 71. The master arm 71 turns about the axis of turning of the shift spindle 60 in synchronization with the turning of the shift spindle 60 integrally with the shift spindle 60.

As shown in FIGS. 6 and 8, the stopper pin 73 as a stopper member is inserted through the restricting hole 71b of the master arm 71 to be directed in the front-back direction such that the axial direction of the stopper pin 73 is parallel to the shift spindle 60.

The stopper pin 73 is formed to have a columnar shape smaller than the restricting hole 71b, and is pressed into and fixed to the transmission holder 26. When the master arm 71 is turned in synchronization with the turning of the shift spindle 60, the inner circumferential surface of the restricting hole 71b comes in contact with the stopper pin 73 to restrict the amount of turning of the master arm 71.

As shown in FIGS. 6 and 8, the shift spindle 60 has the return spring 72 provided thereon which biases the master arm 71 such that the master arm 71 returns to a position before operation.

The return spring 72 has a coil portion 72a and two end portions 72b and 72b extending from the coil portion 72a.

The two end portions 72b extend to the restricting hole 71b along the rear surface of the master arm 71 and extend to near an outer edge of the master arm 71 to surround the stopper pin 73 together with the engaging portion 71e of the master arm 71.

Figure 9:
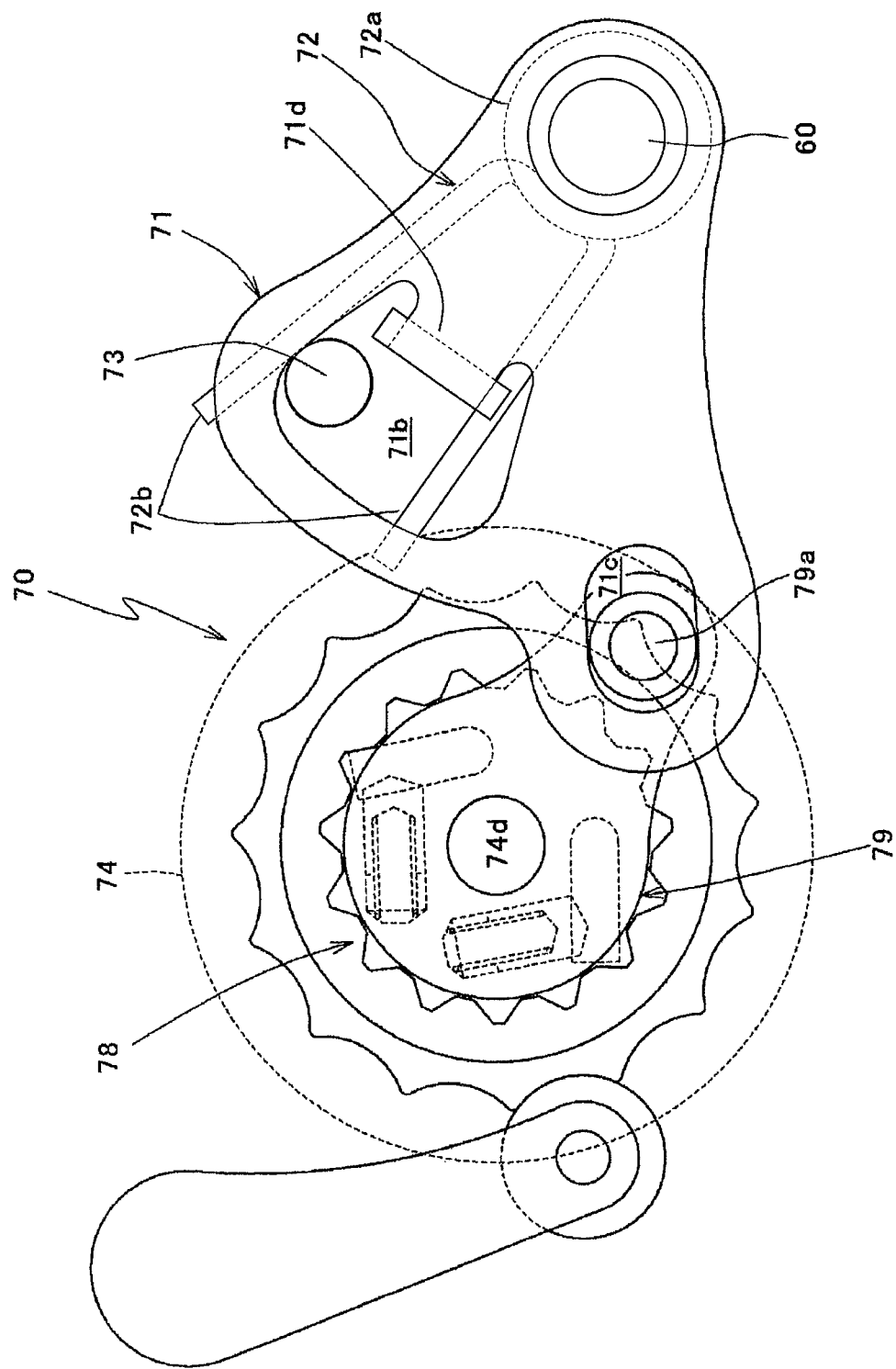
FIG. 9 is a view for explaining movements of the shift spindle and the master arm.

FIG. 9 is a front view showing the master arm 71 turned in one direction from the state shown in FIG. 8.

As shown in FIG. 8, when the shift spindle 60, the engaging portion 71e, and the stopper pin 73 are aligned on the same straight line in the radial direction of the shift spindle 60, the master arm 71 is at a neutral position. Then, when the shift spindle 60 is turned by a driving force being inputted from the inputting mechanism 50 and the master arm 71 turns in either direction, as shown in FIG. 9, the one end portion 72b of the return spring 72 is pressed by the stopper pin 73, and the other end portion 72b thereof is pushed open by the engaging portion 71e of the master arm 71 against a spring force of the return spring 72. Accordingly, the return spring 72 gives the master arm 71 a biasing force acting in a direction in which the master arm 71 returns to the neutral position before operation.

When the input of the driving force from the inputting mechanism 50 is stopped and the force acting on the master arm 71 through the shift spindle 60 disappears, the master arm 71 is returned to the neutral position before operation together with the shift spindle 60 by the return spring 72.

As described above, the amount of turning of the master arm 71 is restricted by the restricting hole 71b of the master arm 71 coming in contact with the stopper pin 73. Accordingly, when gear-shifting speed increases, the master arm 71 sharply collides with the stopper pin 73 to generate an impact. The impact generated in the master arm 71 is transmitted to the first gear 53 through the shift spindle 60, the sector gear 61 on the input side of the shift spindle 60, the second gear 55 on the other end side of the reduction gear shaft 54, and the reduction gear shaft 54. However, since the reduction gear shaft 54 is made of a torsion bar, the impact transmitted from the master arm 71 to the inputting mechanism is reduced by the torsional deflection of the reduction gear shaft 54.

As shown in FIG. 6, the shift drum 74 for performing the gear shifting of the transmission 30 is disposed on the rear surface of the transmission holder 26 inside the transmission chamber 29 such that the shift drum shaft 74d protrudes forward from the front end portion 74a of the shift drum 74.

As shown in FIGS. 6 and 8, the pawl ratchet mechanism 78 for intermittently turning the shift drum 74 is provided on a central portion of the shift drum shaft 74d with respect to the axial direction thereof.

The pawl ratchet mechanism 78 includes a shift input member 79 having a driven protrusion 79a formed thereon and slidably fitted to the drive hole 71c of the master arm 71, a turning member 80 turning integrally with the shift drum 74, and a pair of balls 81 incorporated in the turning member 80 and spring-biased to engage with the inner circumferential surface of the turning member 80.

When the turning of the master arm 71 causes the shift input member 79 to be guided by the driven protrusion 79a sliding in the drive hole 71c and turned in one direction, a tip of one ball 81 of the pawl ratchet mechanism 78 stands up to be engaged with the turning member 80, and the turning member 80 turns in synchronization with the turning of the shift input member 79 to intermittently turn the shift drum 74. Thus, the gear combination of the transmission 30 is established.

As shown in FIG. 6, the shift drum 74 has engagement grooves 74c formed in an outer circumferential surface 74b thereof, and the front end portion 74a thereof is rotatably supported by the transmission holder 26 with a ball bearing 75 interposed therebetween. A rear end portion (not shown) of the shift drum 74 is rotatably supported by the rear cover 18 with a needle bearing (not shown) interposed therebetween when the shift drum 74 is inserted in the transmission chamber 29 as a cassette unit.

The shifter fork shafts 76 are disposed to the left and right of the shift drum 74 to be parallel to the shift drum 74. One end portion of the shifter fork shaft 76 is supported by the transmission holder 26. Another end portion of the shifter fork shaft 76 is supported by the rear cover 18 when the shifter fork shaft 76 is inserted in the transmission chamber 29 as a cassette unit.

Four shifter forks 77 (two of them are not shown) for moving the shifter gears of the transmission 30 are supported by the shifter fork shafts 76 to be slidable in the axial direction.

Basal portions 77a of the shifter forks 77 are engaged with the engagement grooves 74c of the shift drum 74, and tip portions 77b of the shifter forks 77 are engaged with the fork engagement grooves 40a of the shifter gears of the transmission 30 (see FIG. 4).

The turning of the shift drum 74 causes the shifter fork 77 to be guided by the engagement groove 74c and slid in the axial direction of the shifter fork shaft 76 to slide the shifter gear of the transmission 30. Thus, a gear combination is selectively established.

As shown in FIG. 6, a tip portion 74e of the shift drum shaft 74d passes through an opening portion 27d formed in the change system holder 27 to be connected to a shift position sensor 82 for detecting the shift position of the shift drum 74.

The shift position sensor 82 is located ahead of the shift drum 74, disposed on a front surface of the change system holder 27, engaged with a sensor installation recessed portion 27c formed around the opening portion 27d of the change system holder, and fixed to a front surface of the change system holder 27 with sensor installation bolts 82a. The shift position sensor 82 detects the shift position of the shift drum 74.

An NR detection device 83 for detecting a neutral position and a reverse position of the shift drum 74 and sending a signal to an ECU is provided ahead of the shift drum 74 and around the shift position sensor 82.

The NR detection device 83 includes a position plate 84 turning integrally with the shift drum shaft 74d, a neutral switch 85 for detecting the fact that the shift drum 74 comes in a neutral position with the turning of the position plate 84, and a reverse position switch 86 for detecting the fact that the shift drum 74 comes in a reverse position with the turning of the position plate 84.

The position plate 84 is pivotally supported by the shift drum shaft 74d to be incapable of rotation relative to the shift drum shaft 74d and be located between the shift input member 79 and the change system holder 27 with respect to the axial direction of the shift drum shaft 74d.

The position plate 84 is formed in the shape of a disk. A flange portion 84a protruding forward is integrally formed on an outer circumferential edge of the position plate 84. A pin 84b is pressed into a position on the position plate 84 which is radially inside the flange portion 84a.

As shown in FIG. 6, slidable movers 85a and 86a are provided on the neutral switch 85 and the reverse position switch 86. When the movers 85a and 86a are pushed in by the pin 84b and the flange portion 84a of the position plate 84, the neutral position and the reverse position of the transmission 30 are detected.

As shown in FIGS. 5 and 6, the neutral switch 85 is disposed on a front surface of the change system holder 27, on a circumferential path of the pin 84b of the position plate 84, below and to the left of the shift drum shaft 74d, and the reverse position switch 86 is disposed on the front surface of the change system holder 27, on a circumferential path of the flange portion 84a of the position plate 84, to the left of the shift drum shaft 74d.

The above-described gear-shifting mechanism driving device has the following functions and effects:

(a) The gear-shifting mechanism driving device 20 of this embodiment is:

a gear-shifting mechanism driving device which includes the transmission 30 for selectively establishing a gear combination by the turning of the shift spindle 60 for turning the master arm 71, and the actuator 51 as a power source for turning the shift spindle 60, the reduction gear shaft 54 provided in the power transmission path between the actuator 51 and the shift spindle 60, the first gear 53 provided on one end side of the reduction gear shaft 54 to receive power from the actuator 51 side, and the second gear 55 provided on another end side of the reduction gear shaft 54 to transmit power to the shift spindle 60 side.

The reduction gear shaft 54 is made of a torsion bar. Accordingly, in the gear-shifting mechanism driving device 20, transmitted torque acting on the reduction gear shaft 54 having the first gear 53 provided on the one end side thereof to receive power from the actuator 51 and having the second gear 55 provided on the other end side thereof to transmit power to the shift spindle 60 side is smaller than transmitted torque acting on the shift spindle 60.

Thus, since the reduction gear shaft 54 is made of a torsion bar, the shaft diameter can be made small. Accordingly, the reduction gear shaft 54 can be easily twisted to sufficiently absorb an impact acting on the master arm 71, and the weight of the reduction gear shaft 54 can be reduced.

In other words, in the gear-shifting mechanism driving device 20, even in the case where the shift spindle 60 is short, a gear-shifting operation can be speedily and accurately performed, and the weight of the gear-shifting mechanism driving device 20 can be reduced.

(b) The reduction gear shaft 54 is formed such that the portion 54c other than the gear support portions 54b and 54d for supporting the first gear 53 and the second gear 55 has a smaller diameter (Dl) than the gear support portions 54b and 54d. Accordingly, the reduction gear shaft 54 can be made easy to twist while ensuring the strengths of the gear support portions 54b and 54d for supporting the first gear 53 and the second gear 55 so that the reduction gear shaft 54 can sufficiently absorb an impact acting on the master arm 71, and the weight of the reduction gear shaft 54 can be reduced. It should be noted that such effects can be obtained even in the case where the portion 54c other than the gear support portion 54b or 54d for supporting the first gear 53 or the second gear 55 has a smaller diameter (Dl) than the gear support portion 54b or 54d.

(c) The reduction gear shaft 54 is disposed next to the shift spindle 60 to be parallel to the shift spindle 60 and overlap the shift spindle 60 with respect to the axial direction. Accordingly, a function of the reduction gear shaft 54 as a torsion bar can be made favorable, and the size of the device 20 can be reduced.

(d) Since the master arm 71 is disposed between the first gear 53 and the second gear 55, the master arm 71 is disposed within the range of the reduction gear shaft 54 with respect to the longitudinal direction thereof. Thus, the length of the device 20 with respect to the axial direction thereof can be reduced.

(e) The actuator 51 is a motor, and the reduction gear shaft 54 is disposed next to the output shaft 51a of the motor 51 to be parallel to the output shaft 51a and overlap the output shaft 51 a with respect to the axial direction. Accordingly, the actuator 51 can be disposed within the range of the reduction gear shaft 54 with respect to the longitudinal direction thereof. Thus, the size of the device 20 can be reduced.

(f) The reduction gear shaft 54 and the shift spindle 60 may be supported by the same wall portion W on the second gear 55 side of the reduction gear shaft 54.

In this configuration, the accuracy of the relative position between the reduction gear shaft 54 and the shift spindle 60 can be made favorable on the second gear 55 side of the reduction gear shaft 54.

While an embodiment of the present invention has been described above, the present invention is not limited to the above-described embodiment, but can be appropriately modified and carried out within the scope of the spirit of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gear-shifting mechanism driving device including a transmission for selectively establishing a gear combination by turning of a shift spindle for turning a master arm and an actuator as a power source for turning the shift spindle, the gear-shifting mechanism driving device comprising:
   a reduction gear shaft provided in a power transmission path between the actuator and the shift spindle;
   a first gear provided on one end side of the reduction gear shaft to receive power from the actuator side; and
   a second gear provided on another end side of the reduction gear shaft to transmit power to the shift spindle side;
   wherein the reduction gear shaft comprises a torsion bar.

2. The gear-shifting mechanism driving device according to claim 1, wherein in the reduction gear shaft, a portion other than a gear support portion or portions supporting the first gear and/or the second gear has a smaller diameter than the gear support portion or portions.

3. The gear-shifting mechanism driving device according to claim 1, wherein the reduction gear shaft is disposed next to the shift spindle to be parallel to the shift spindle and overlap the shift spindle with respect to an axial direction thereof.

4. The gear-shifting mechanism driving device according to claim 2, wherein the reduction gear shaft is disposed next to the shift spindle to be parallel to the shift spindle and overlap the shift spindle with respect to an axial direction thereof.

5. The gear-shifting mechanism driving device according to claim 3, wherein the master arm is disposed between the first gear and the second gear.

6. The gear-shifting mechanism driving device according to claim 1, wherein the actuator is a motor, and the reduction gear shaft is disposed next to an output shaft of the motor to be parallel to the output shaft and overlap the output shaft with respect to an axial direction thereof.

7. The gear-shifting mechanism driving device according to claim 2, wherein the actuator is a motor, and the reduction gear shaft is disposed next to an output shaft of the motor to be parallel to the output shaft and overlap the output shaft with respect to an axial direction thereof.

8. The gear-shifting mechanism driving device according to claim 3, wherein the actuator is a motor, and the reduction gear shaft is disposed next to an output shaft of the motor to be parallel to the output shaft and overlap the output shaft with respect to an axial direction thereof.

9. The gear-shifting mechanism driving device according to claim 5, wherein the actuator is a motor, and the reduction gear shaft is disposed next to an output shaft of the motor to be parallel to the output shaft and overlap the output shaft with respect to an axial direction thereof.

10. The gear-shifting mechanism driving device according to claim 1, wherein the reduction gear shaft and the shift spindle are supported by a same wall portion on the second gear side of the reduction gear shaft.

11. The gear-shifting mechanism driving device according to claim 2, wherein the reduction gear shaft and the shift spindle are supported by a same wall portion on the second gear side of the reduction gear shaft.

12. The gear-shifting mechanism driving device according to claim 3, wherein the reduction gear shaft and the shift spindle are supported by a same wall portion on the second gear side of the reduction gear shaft.

13. The gear-shifting mechanism driving device according to claim 5, wherein the reduction gear shaft and the shift spindle are supported by a same wall portion on the second gear side of the reduction gear shaft.

14. The gear-shifting mechanism driving device according to claim 6, wherein the reduction gear shaft and the shift spindle are supported by a same wall portion on the second gear side of the reduction gear shaft.

15. A gear-shifting mechanism driving device comprising:
   a shift spindle operatively connected to a master arm for selectively turning the master arm;
   a transmission for selectively establishing a gear combination by the turning of the shift spindle for turning the master arm;
   an actuator for turning the shift spindle;
   said gear-shifting mechanism driving device including:
      a reduction gear shaft provided in a power transmission path between the actuator and the shift spindle;
      a first gear provided on one end side of the reduction gear shaft to receive power from the actuator side; and
      a second gear provided on another end side of the reduction gear shaft to transmit power to the shift spindle side;
   wherein the reduction gear shaft comprises a torsion bar.

16. The gear-shifting mechanism driving device according to claim 15, wherein in the reduction gear shaft, a portion other than a gear support portion or portions supporting the first gear and/or the second gear has a smaller diameter than the gear support portion or portions.

17. The gear-shifting mechanism driving device according to claim 15, wherein the reduction gear shaft is disposed next to the shift spindle to be parallel to the shift spindle and overlap the shift spindle with respect to an axial direction thereof.

18. The gear-shifting mechanism driving device according to claim 17, wherein the master arm is disposed between the first gear and the second gear.

19. The gear-shifting mechanism driving device according to claim 15, wherein the actuator is a motor, and the reduction gear shaft is disposed next to an output shaft of the motor to be parallel to the output shaft and overlap the output shaft with respect to an axial direction thereof.

20. The gear-shifting mechanism driving device according to claim 15, wherein the reduction gear shaft and the shift spindle are supported by a same wall portion on the second gear side of the reduction gear shaft.

* * * * *